US009298333B2

(12) United States Patent
Gay

(10) Patent No.: US 9,298,333 B2
(45) Date of Patent: Mar. 29, 2016

(54) GESTURING ARCHITECTURE USING PROXIMITY SENSING

(75) Inventor: Kenneth W. Gay, Tucson, AZ (US)

(73) Assignee: SMSC HOLDINGS S.A.R.L., Luxembourg (LU)

( * ) Notice: Subject to any disclaimer, the term of this patent is extended or adjusted under 35 U.S.C. 154(b) by 78 days.

(21) Appl. No.: 13/334,477

(22) Filed: Dec. 22, 2011

(65) Prior Publication Data

US 2013/0162517 A1    Jun. 27, 2013

(51) Int. Cl.
| G06F 3/041 | (2006.01) |
| G06F 3/046 | (2006.01) |
| G06F 3/044 | (2006.01) |
| G01S 13/04 | (2006.01) |

(52) U.S. Cl.
CPC .............. *G06F 3/046* (2013.01); *G01S 13/04* (2013.01); *G06F 3/044* (2013.01)

(58) Field of Classification Search
CPC ................................. G06F 3/046; G06F 3/041
USPC .................... 715/700, 762, 763, 764
See application file for complete search history.

(56) References Cited

U.S. PATENT DOCUMENTS

| 3,896,425 | A | * | 7/1975 | Erichsen ...................... 340/563 |
| 4,952,757 | A | | 8/1990 | Purcell et al. ............. 178/18.07 |
| 5,815,117 | A | | 9/1998 | Kolanek ........................ 342/442 |
| 5,844,415 | A | * | 12/1998 | Gershenfeld et al. ......... 324/663 |
| 5,936,412 | A | * | 8/1999 | Gershenfeld et al. ......... 324/663 |
| 7,078,911 | B2 | | 7/2006 | Cehelnik |
| 7,312,788 | B2 | | 12/2007 | Fleischmann et al. |
| 7,509,131 | B2 | | 3/2009 | Krumm et al. |
| 7,532,196 | B2 | | 5/2009 | Hinckley |
| 7,653,883 | B2 | * | 1/2010 | Hotelling et al. ............. 715/863 |
| 7,656,394 | B2 | | 2/2010 | Westerman et al. |
| 7,868,746 | B2 | | 1/2011 | Richter |
| 7,969,166 | B2 | | 6/2011 | Fasshauer |

(Continued)

FOREIGN PATENT DOCUMENTS

WO          97/31238 A1    8/1997   ............... B60N 2/00

OTHER PUBLICATIONS

Freescale Semiconductor,Touch Panel Applications Using MC34940/MC33794 E-Field ICs,Nov. 2006, Freescale Semiconductor, Rev.4.*

(Continued)

*Primary Examiner* — Kent Chang
*Assistant Examiner* — Herbert L Hagemeier
(74) *Attorney, Agent, or Firm* — Slayden Grubert Beard PLLC

(57) ABSTRACT

Proximity based system and method for detecting user gestures. Each of a plurality of proximity sensing circuits may collect digital data. Each proximity sensing circuit may include an antenna configured to transmit and receive electromagnetic signals and a shield driver configured to shield signals transmitted by the antenna in one or more directions. The digital data may be collected based on electromagnetic signals received from another proximity sensing circuit via the antenna. The received electromagnetic signals may be modified by one or more user proximity gestures. The digital data from each of the plurality of proximity sensing circuits may be received by a coordinating circuit. The coordinating circuit may produce coordinated digital data from the digital data received from each of the plurality of proximity sensing circuits. The coordinated digital data may be configured for use in determining that a user performed the one or more user proximity gestures.

22 Claims, 12 Drawing Sheets

(56) References Cited

U.S. PATENT DOCUMENTS

| | | | |
|---|---|---|---|
| 2002/0190964 A1* | 12/2002 | Van Berkel | 345/173 |
| 2005/0206565 A1 | 9/2005 | Osaka et al. | 342/433 |
| 2006/0152482 A1 | 7/2006 | Godwin | 345/156 |
| 2006/0161870 A1 | 7/2006 | Hotelling et al. | |
| 2006/0238520 A1 | 10/2006 | Westerman et al. | |
| 2008/0042986 A1 | 2/2008 | Westerman et al. | |
| 2008/0088413 A1 | 4/2008 | Richter | |
| 2008/0266271 A1 | 10/2008 | Van Berkel et al. | 345/174 |
| 2009/0021489 A1* | 1/2009 | Westerman et al. | 345/173 |
| 2009/0051660 A1 | 2/2009 | Feland, III et al. | |
| 2009/0219255 A1 | 9/2009 | Woolley et al. | |
| 2009/0295366 A1 | 12/2009 | Cehelnik | |
| 2009/0315848 A1 | 12/2009 | Ku et al. | |
| 2009/0322328 A1 | 12/2009 | Cehelnik | |
| 2010/0044120 A1 | 2/2010 | Richter | |
| 2010/0063813 A1 | 3/2010 | Richter et al. | |
| 2010/0188328 A1 | 7/2010 | Dodge et al. | |
| 2010/0194209 A1 | 8/2010 | Richter | |
| 2010/0253319 A1 | 10/2010 | Cehelnik | |
| 2010/0264097 A1 | 10/2010 | Sun et al. | 210/767 |
| 2010/0277186 A1* | 11/2010 | Bieck et al. | 324/674 |
| 2010/0295559 A1* | 11/2010 | Osoinach | 324/658 |
| 2010/0300771 A1 | 12/2010 | Miyazaki | |
| 2010/0321289 A1 | 12/2010 | Kim et al. | 345/156 |
| 2010/0328328 A1* | 12/2010 | Choi et al. | 345/530 |
| 2011/0025345 A1 | 2/2011 | Unterreitmayer | |
| 2011/0063224 A1* | 3/2011 | Vexo et al. | 345/168 |
| 2011/0109577 A1 | 5/2011 | Lee et al. | |
| 2011/0115729 A1 | 5/2011 | Kremin et al. | |
| 2011/0169506 A1 | 7/2011 | Aubauer et al. | |
| 2011/0180693 A1 | 7/2011 | Ritter et al. | 250/214 A |
| 2011/0180709 A1 | 7/2011 | Craddock et al. | |
| 2011/0181510 A1 | 7/2011 | Hakala et al. | 345/158 |
| 2012/0044199 A1* | 2/2012 | Karpin et al. | 345/174 |

OTHER PUBLICATIONS

Freescale Semiconductor, Electric Field Imaging Device, Nov. 2006, Freescale Semiconductor, Rev.9.*

Touch Panel Applications Using MC34940/MC33794 E-Field ICs, Freescale Semiconductor, Nov. 2006, Rev.4, AN1985.*

International Search Report and Written Opinion, Application No. PCT/US2012/068867, 12 pages, Mar. 5, 2013.

Sidhant Gupta, et al., "LightWave: Using Compact Fluorescent Lights as Sensors," UbiComp'11, Proceedings of the 13th International Conference on Ubiquitous Computing, Sep. 17-21, 2011, 10 pages.

* cited by examiner

GESTURING ARCHITECTURE USING PROXIMITY SENSING

FIELD OF THE INVENTION

The present invention relates to the field of electronic devices, and more particularly to an architecture for detecting and interpreting gestures using proximity sensing.

DESCRIPTION OF THE RELATED ART

Gesturing is a general term for a user's physical movement intended to interact with a consumer product or computing device. A familiar example of gesturing using capacitive touch sensing is the "pinching" or rotating movements to manipulate images on a touchscreen of products such as smart phones and tablet computers.

However, in many contexts where gesture-based user input would be desirable, touch gestures may not be safe or practical. Locating and pressing buttons to pan or zoom a GPS display while driving may consume too much driver attention to be safe, for example. Accordingly, improvements in the field would be desirable.

SUMMARY OF THE INVENTION

One embodiment relates to a proximity sensing system for detecting and interpreting user proximity gesture that would enable gesturing in situations where touch-based gestures may not be safe or practical. A proximity gesture is a gesture which is sensed or detected based on the proximity of the user (or a user-controlled implement such as a stylus) that does not require the user (or user-controlled implement) to physically touch the sensing element. Embodiments of this disclosure relate to such a method for proximity sensing based gesture detection and interpretation and a system configured to implement the method.

The system may include a plurality of proximity sensing circuits, a coordinating circuit, and in some embodiments, an interpretation circuit. Each of the proximity sensing circuits may include an antenna configured to transmit and receive electromagnetic signals and a shield driver configured to shield signals transmitted by the antenna in one or more directions. Each of the proximity sensing circuits, the coordinating circuit, and the interpretation circuit may also include logic configured to implement aspects of the method.

The coordination circuit may be coupled to each of the proximity sensing circuits. According to one set of embodiments, the coordinating circuit and each of the plurality of proximity sensing circuits may be coupled via unidirectional data couplings. The coordination circuit may also be coupled to the interpretation circuit. In some embodiments, the system may further include a single flexible substrate, on which the plurality of proximity sensing circuits and the coordinating circuit may be located. In this case the different components may be permanently coupled via connections (e.g., communication buses) which are also located on the single flexible substrate. In other embodiments the proximity sensing circuits and the coordinating circuit may not be located on a single substrate and/or the separate components may be configured to be coupled via separable connectors. The method may be performed as follows.

Each of the plurality of proximity sensing circuits may collect digital data. The digital data may be collected based on electromagnetic signals received from another proximity sensing circuit via the antenna. In some embodiments, the plurality of proximity sensing circuits may be configured to transmit and receive electromagnetic signals in a coordinated manner. For example, in one set of embodiments, at a first time, a first proximity sensing circuit may transmit first electromagnetic signals while a second proximity sensing circuit receives the first electromagnetic signals. Then, at a second time, the second proximity sensing circuit may transmit second electromagnetic signals while the first proximity sensing circuit receives the second electromagnetic signals.

As noted above, each proximity sensing circuit may include a shield driver. The shield driver of a proximity sensing circuit may be configured to shield signals transmitted by the antenna of the proximity sensing circuit in one or more directions. This may include driving the shield driver in phase with signals transmitted by the antenna in order to shield the signals transmitted by the antenna in the one or more directions.

The received electromagnetic signals may be modified by one or more user proximity gestures. In some embodiments, the digital data collected by each of the plurality of proximity sensing circuits may be a digital representation of signal strength of electromagnetic signals received from another proximity sensing circuit; in this case the signal strength of the electromagnetic signals may be modified by the one or more user proximity gestures.

The digital data from each of the plurality of proximity sensing circuits may be received by the coordinating circuit. The coordinating circuit may receive the digital data from each of the plurality of proximity sensing circuits according to a schedule; in some embodiments, the coordinating circuit may receive digital data from one proximity sensing circuit at a time.

In some embodiments, coordination of the plurality of proximity sensing elements may be provided by the coordinating circuit. For example, the coordinating circuit may control which proximity sensing circuit(s) transmit and which proximity sensing circuit(s) collects data at any given time, and/or may control from which proximity sensing circuit the coordinating circuit receives digital data at any given time. Thus, in some embodiments, the coordinating circuit may effectively perform time-multiplexing of the sensors and the data received from the sensors.

The coordinating circuit may produce coordinated (e.g., time-multiplexed) digital data from the digital data received from each of the plurality of proximity sensing circuits. In other words, the coordinated digital data may include the digital data from each of the plurality of proximity sensing circuits.

The coordinated digital data may be configured for use in determining that a user performed the one or more user proximity gestures. In some embodiments, the coordinated digital data may be received by the interpretation circuit, which may interpret the coordinated digital data. Interpretation of the coordinated digital data may include determining that a user performed the one or more user proximity gestures.

In some embodiments, the plurality of proximity sensing circuits may include two proximity sensing circuits. The two proximity sensing circuits may be configured to produce digital data configured for detection and interpretation of gestures in one dimension (e.g., a dimension along an axis defined by a line between the two proximity sensing circuits). In other embodiments, the plurality of proximity sensing circuits may include three, four, or another number of proximity sensing circuits. In such embodiments, the plurality of proximity sensing circuits may be configured to produce digital data configured for detection and interpretation of gestures in two or even three dimensions.

Proximity sensing in low-cost, high-volume consumer electronics devices presents a particular set of challenges. Such devices tend to present noisy environments that exaggerate the effects of signaling, routing, shielding, filtering, and other design choices. According to one set of embodiments, coordinated use of a plurality of discrete sensor elements, which each include a shield driver and produce digital data locally, may generate many of the advantages of the above-described method as a solution to these challenges.

Using a plurality of discrete sensor elements (e.g., the plurality of proximity sensing circuits) may provide increased flexibility with respect to implementation of the system. A system configured to detect gestures based on proximity may typically rely on distribution of antennas at some distance from each other, and possibly even at opposite ends of a device. Rather than rigidly implementing a system including distributed antennas as a single integrated circuit, it may be advantageous to implement the system using discrete sensor circuits (e.g., slave ICs) which may be coupled to a coordinating circuit (e.g., a master IC).

Use of a shield driver in each proximity sensing element may increase the efficiency of the proximity sensing circuits in generating and detecting variations in an electromagnetic field, by reducing the field-distorting effects of nearby metal surfaces or other field-distorting elements.

Similarly, use of digital measurements (or local conversion to digital information) and routing of digital signals to the coordinating and/or interpretation circuit by the proximity sensing circuits may be advantageous relative to use of analog measurements and routing analog signals. Transfer of digital data may not require the level of shielding that would be required (e.g., in such typically noisy environments) for transfer of analog data, thereby providing a simpler and potentially less costly solution.

Thus, a system implemented according to embodiments of this disclosure may represent an effective system for sensing and interpreting a user's proximity gestures, which is sufficiently flexible and inexpensive as to be suitable for implementation in a wide variety of electronic and computing devices.

BRIEF DESCRIPTION OF THE DRAWINGS

A better understanding of the present invention can be obtained when the following detailed description of the preferred embodiment is considered in conjunction with the following drawings, in which.

Figure 1A:
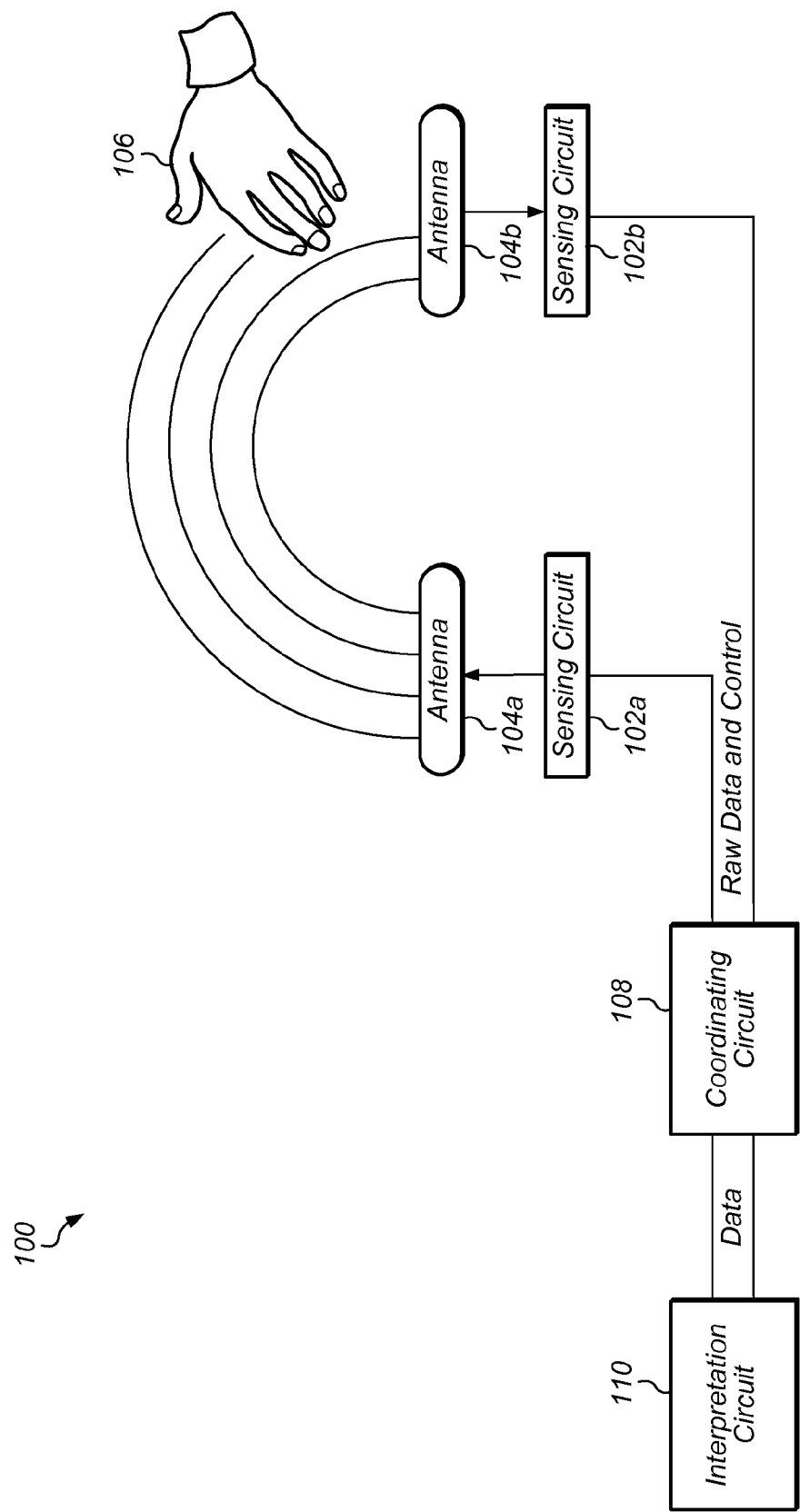
FIGS. 1A-1C illustrate an exemplary proximity sensing system according to one set of embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Embodiments of this disclosure relate to a system and method for detecting and interpreting proximity gestures. Gesturing is a general term for a user's physical movement intended to interact with a consumer product or computing device. A familiar example of gesturing using capacitive touch sensing is the "pinching" or rotating movements to manipulate images on a touchscreen of products such as smart phones and tablet computers.

Proximity gesturing is a more specific term for a user's physical movement which does not physically contact a sensory device. In other words, a proximity gesture is a gesture which is sensed or detected based on the proximity of the user (or a user-controlled implement such as a stylus) that does not require the user (or user-controlled implement) to physically touch the sensing element. For example, one popular non-contact application for gesturing is video console recognition of user movement for game interaction.

Uses for proximity gesturing may be context sensitive for a particular application. For instance, a left-right gesture might mean may be interpreted as "next picture", "page turn" or "volume up" in the corresponding application and have no meaning at all in a different application. In some situations, proximity gesturing user interaction systems may be particularly desirable may be based on safety or practicality. For example, locating and pressing buttons to pan or zoom a GPS display while driving may consume too much driver attention to be safe, but using a gesture to perform these functions may not. In many embodiments, desired detection ranges of proximity sensing systems may range from 4-12" for most applications; however, various (e.g., specialized) systems may have an alternative (e.g., greater or lesser) effective range.

Embodiments of this disclosure relate to a simple, efficient, and therefore potentially low-cost system and method for implementing proximity gesturing. In particular, the simplicity, efficiency, and cost of the system as a whole may be emphasized without neglecting that of individual components.

Figure 1B:
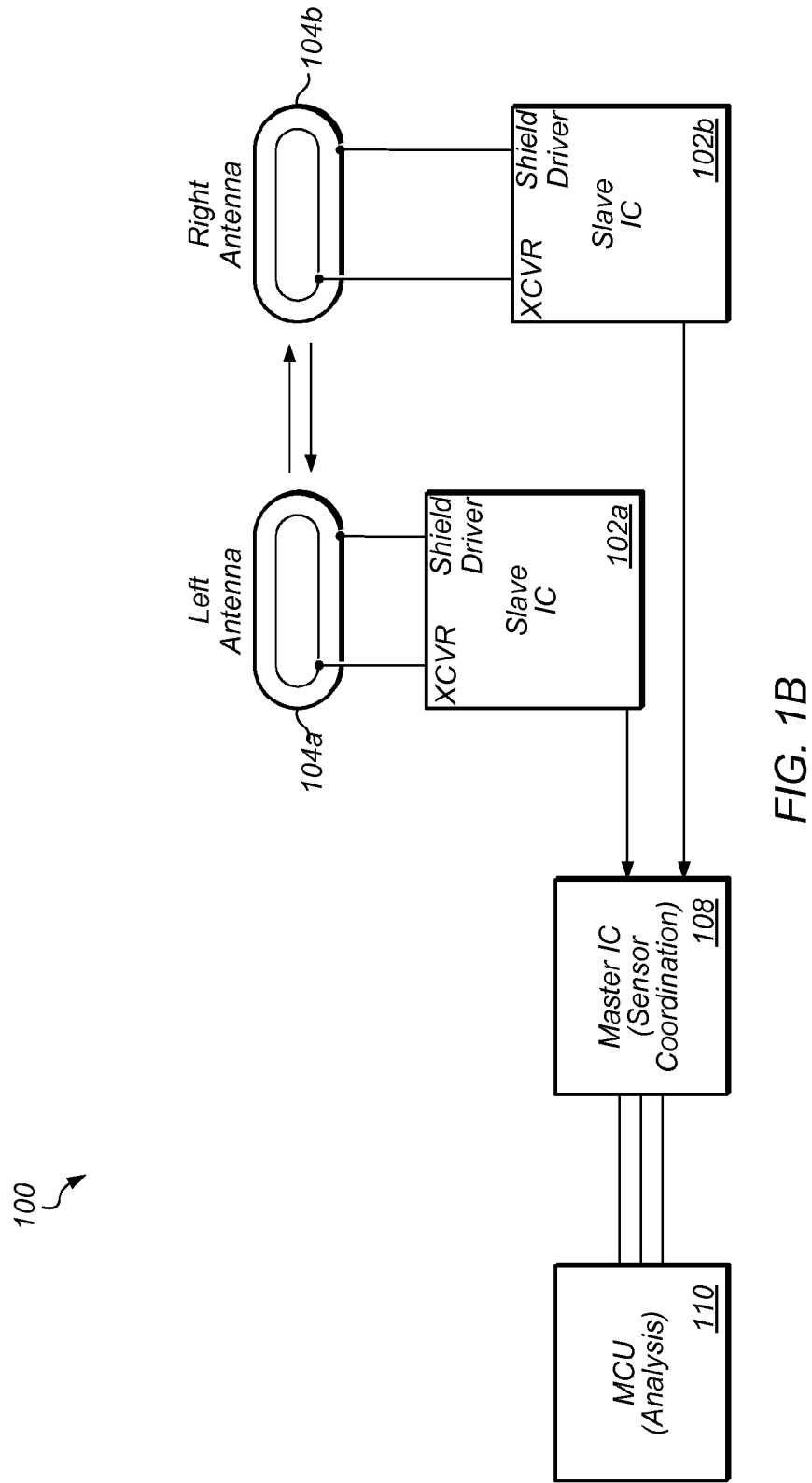
Figure 1C:
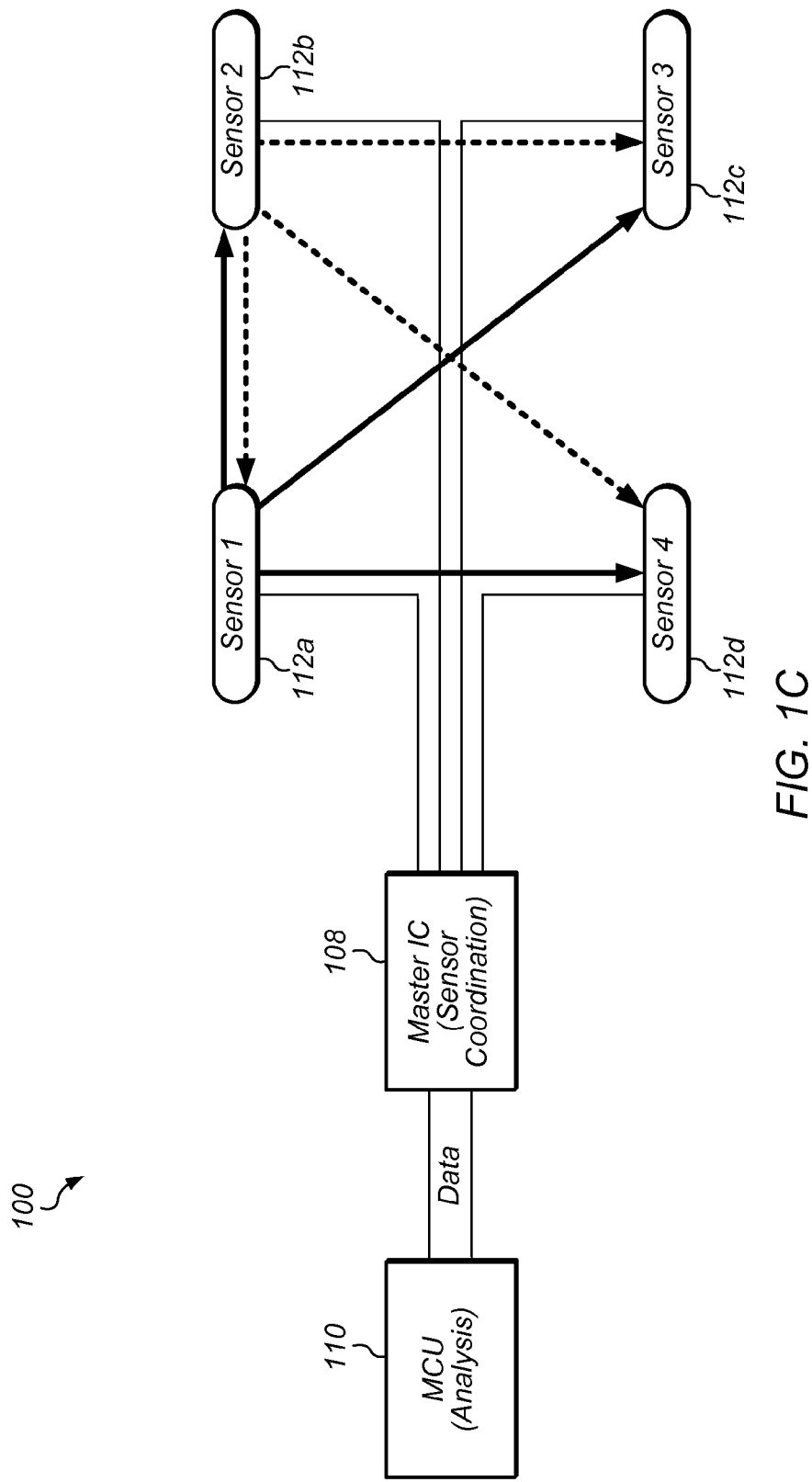

FIGS. 1A-1C—Exemplary Proximity Sensing System

FIG. 1A illustrates an exemplary proximity sensing system 100 according to one set of embodiments. The proximity sensing system 100 may be suited for use in a variety of applications. For example, the proximity sensing system 100 may be suitable for use in a mobile device such as a cellular telephone or smart phone, a portable media player, an e-reader such as a Kindle or Nook, a tablet, laptop, or desktop computer system, an informational kiosk, an automotive control panel, or any of a variety of other systems in which implementing a capability to detect and interpret a user's proximity gestures would be desirable.

As shown, the system 100 may include a plurality of sensing circuits 102a-b (also referred to herein as "proximity sensing circuits") which may each be capable of transmitting and/or receiving electromagnetic signals (e.g., using respective antennas 104a-b). The electromagnetic signals generated by one sensor may form an electromagnetic field in the vicinity of the generating sensor. Each other sensor may be capable of monitoring the electromagnetic field, e.g., by measuring signal strength. If an object (such as user's hand 106) disturbs the electromagnetic field, this will affect the signal strength of the electromagnetic field, e.g., as measured at any sensors which may be monitoring the electromagnetic field.

In one set of embodiments, the sensing circuits 102 may include one or more capacitive sensing inputs configured to receive user input by detecting variations in the electromagnetic field generated by another sensor. For example, the capacitive sensing inputs may include conductive material (such as conductive copper traces) configured to form one or more capacitors upon excitation. Variations in the strength of the electric field (e.g., variations in capacitance) caused by disturbances (such as proximity of a human finger or other conductive input mechanism) may be measured and/or transmitted to another system element, such as coordinating circuit 108. Other electromagnetic field strength/disturbance sensing techniques are also possible, and numerous variations in the details of the implementation of the proximity sensing inputs may be possible and should be considered within the scope of this disclosure.

In some embodiments, sensing circuits may alternate or take turns transmitting or receiving electromagnetic signals. For example, while sensing circuit 102a is transmitting and sensing circuit 102b is receiving in FIG. 1, at a later time sensing circuit 102b may transmit electromagnetic signals (thereby generating an electromagnetic field) while sensing circuit 102a may receive the electromagnetic signals (e.g., monitoring the electromagnetic field/measuring the signal strength of the electromagnetic signals).

Thus, the sensing circuits 102 may produce raw data based on the signal strength measurements of the electromagnetic field. By alternately transmitting/receiving (possibly in a rapid manner), the combined raw data of the different sensors may contain sufficient information to determine various characteristics of objects in the vicinity of the sensing circuits 102, such as one or more of basic presence, shape, position relative to the sensing circuits 102, direction of movement (e.g., in one, two, or three dimensions, depending on the number and sensitivity of the sensing circuits 102), speed of movement, etc.

However, it may be difficult or impossible to determine such characteristics from the individual raw data of a single sensing circuit. Accordingly, the sensing circuits 102 may be coupled to a coordinating circuit 108. The coordinating circuit may provide coordination and control of the sensing circuits 102, e.g., in order to produce a coherent and usable data set. For example, the coordinating circuit 108 may indicate to the individual sensing circuits 102 when to transmit and when to receive using their respective antennas 104. The coordinating circuit 108 may also receive the raw data from each of the individual sensing circuits 102 via coupling elements (e.g., wired communication buses) in a controlled manner (e.g., according to a schedule and/or based on when a sensing circuit 102 is recording data based on electromagnetic signals received via its antenna 104).

The coordinated data set produced by coordinating circuit 108 may be provided to an interpretation circuit 110 for interpretation. As noted above, the data from the sensing circuits 102 may be usable to determine various characteristics of objects in the vicinity of the sensing circuits 102. The interpretation circuit 110 may be configured to analyze and interpret the coordinated data set and determine that a user has performed one or more proximity gestures in the vicinity of the sensing circuits 102.

FIG. 1B is an alternate illustration of the proximity sensing system 100. As illustrated in FIG. 1B, the sensing circuits 102a-b may be implemented as "slave" integrated circuits (ICs) with pin connections for the antenna ("XCVR"), shield driver, and raw data out to the coordinating circuit 108. Other pin connections may also be included. The coordinating circuit 108, as shown, may be implemented as a "master" integrated circuit, which may be coupled to the interpretation circuit 110 via a data coupling. The interpretation circuit 110 may in turn be implemented as a host microcontroller (MCU), which may, depending on the implementation, may be dedicated to proximity gesture interpretation or may also provide other embedded systems control functions.

FIG. 1C illustrates an alternate embodiment of a proximity sensing system 100. It should be noted that each of the "sensors" 112, as shown in FIG. 1C, may include both a sensing circuit (e.g., a slave IC) and an antenna (e.g., sensor 112a might include sensing circuit 102a and antenna 104a). As shown, in addition to sensors 112a-b, there may also be additional sensors 112c-d in some embodiments. Systems with more than two sensors may be more suitable for detection of two- or three-dimensional gestures in some embodiments. Sensors 112a-b are shown as both transmitting signals to all of the other sensors (which may be desirable according to some embodiments), but it should be noted that in many embodiments only one sensor may be transmitting at a time, e.g., in order to provide a relatively simple electromagnetic field. While sensors 112c-d are not shown as transmitting signals, it should be noted that they may also be capable of transmitting as well as receiving signals. Thus in some embodiments, each of the four sensors 112a-d may transmit (e.g., one-at-a-time) in turn while the other three sensors (e.g., one or more at a time) receive signals/monitor the electromagnetic field.

In a similar manner as in FIG. 1B, in the embodiments of FIG. 1C, the interpretation circuit 110 may be implemented as a host MCU while the coordination circuit 108 may be implemented as a master IC.

It should be noted that while the sensing circuits 102 and antennas 104, the coordinating circuit 108, and the interpretation circuit 110 are shown in FIGS. 1A-1C as discrete elements (and are shown as specific types of circuits in FIGS. 1B-1C), it should be noted that some or all of the functions of these elements may be combined on a single circuit (and/or using different types of circuits than shown), if desired. For example, the sensing circuits 102, coordinating circuit 108, and interpretation circuit 110 may be implemented as hardware (e.g, an integrated circuit), as software (e.g., a processor and memory medium including program instructions executable by the processor), or a combination of hardware and software, as desired.

In one set of embodiments, the proximity sensing circuits, the shield driver, the coordination circuit, and the interpretation circuit may all be comprised on a single flexible substrate. In other embodiments, a different (e.g., rigid) substrate or a combination of multiple substrates (e.g., for different circuit portions) and/or different types of substrates may be used.

In addition, in some embodiments the system may be relatively thin and sleek in accordance with the small size of many of the types of electronic devices (e.g., consumer devices) in which the system may typically be implemented. For example, in one set of embodiments, a realistic expectation for the electrode elements and flex circuit boards is 0.25" wide by 0.020" thick, with the length being product specific. Any number of other system sizes (including larger or smaller systems) and shapes may alternatively be appropriate, depending on the application.

Figure 2A:
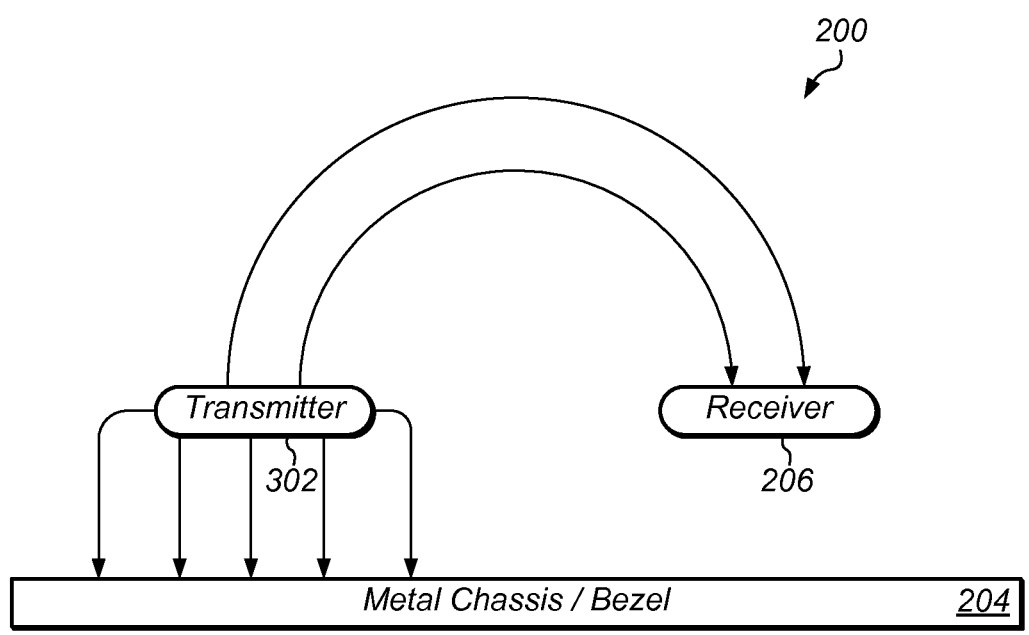
FIGS. 2A-2B illustrate a transmitter-receiver system without a shield driver and a transmitter-receiver system with a shield driver according to one set of embodiments.
Figure 2B:
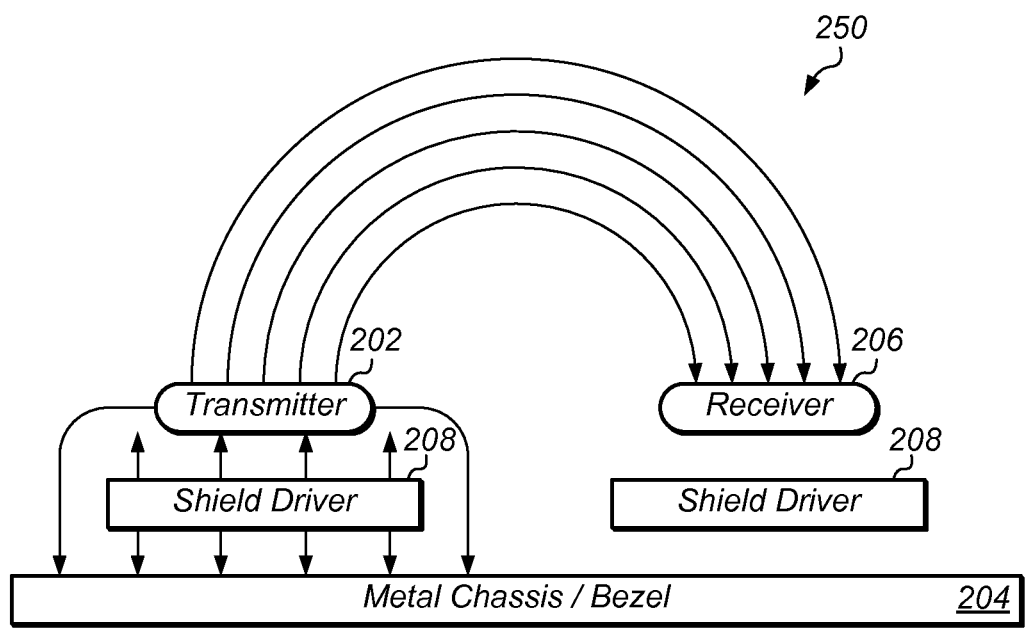

FIGS. 2A-2B—Transmitter-Receiver System without and with Shield Driver

The electro-mechanical design constraints in consumer products add to the challenges of providing a proximity sensing gesturing system. Proximity electrodes may often be located directly on metal cases or bezels which will short out the electromagnetic fields and inject noise and electrostatic discharge (ESD) into the sensitive signals. To isolate the transmit- and receive-electrodes from these conflicting elements a signal shield driver may be employed. The signal shield driver may provide a replica of the transmitted signal that drives a shield layer between the electrode and the offending metal surface so the transmit signal is not shorted out directly to the metal.

FIGS. 2A-2B illustrate a transmitter-receiver system 200 without a shield driver and a transmitter-receiver system 250 with a shield driver. As shown in FIG. 2A, if the transmitter 202 is in close proximity to a metal chassis/bezel 204 or other grounding feature (as may be common in consumer electronics), the field lines will be strongly attracted to the nearby ground. As a result, the electromagnetic field in the vicinity of the receiver 206 will be relatively weak, which may negatively affect the ability of the receiver 206 to produce data which is useful in sensing proximity gestures.

In contrast, in FIG. 2B shield driver 208 is shown as being driven in phase with the transmitted signal. In this case, the field lines (e.g., representing the electromagnetic field produced as a result of transmitter 202 transmitting electromagnetic signals) project generally away from the nearby ground because the shield driver is effectively shielding the signals in the direction of the metal chassis/bezel 204. As a result, a stronger electromagnetic field may project towards receiver 206, as indicated by the increased number of field lines projecting towards receiver 206. This may in turn increase the quality of the data produced by receiver 206 with respect to its usefulness in detecting and interpreting user proximity gestures. The increased quality of the data may be a result of the greater signal strength in general and/or more specifically because greater variation in signal strength may result from user proximity gestures with a shield driver than from similar user proximity gestures without a shield driver.

Figure 3:
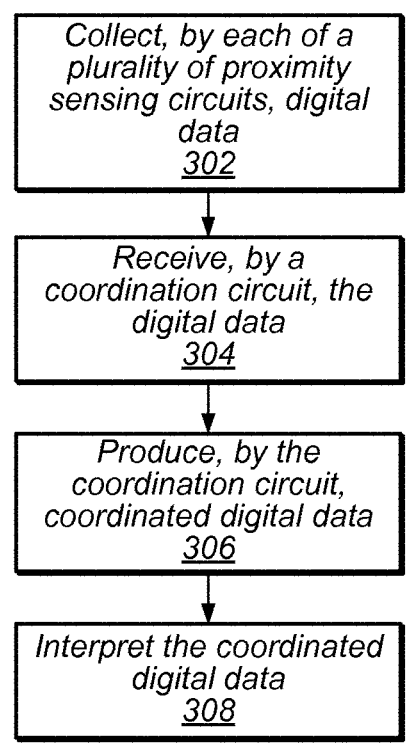
FIG. 3 is a flowchart diagram illustrating a method for collecting proximity sensing data according to one set of embodiments.

FIG. 3—Method for Collecting Proximity Sensing Data

FIG. 3 is a flowchart diagram illustrating an exemplary method for collecting proximity sensing data. The method shown in FIG. 3 may be used in conjunction with any of the systems shown in the above Figures, among other systems. In various embodiments, some of the method elements shown may be performed concurrently, performed in a different order than shown, or omitted. Additional method elements may also be performed as desired. As shown, this method may operate as follows.

In 302, digital data may be collected by each of a plurality of proximity sensing circuits. Each proximity sensing circuit may include an antenna configured to transmit and receive electromagnetic signals. The antenna may be a simple electrode configured to generate an electromagnetic field/capacitively measure the strength of an electromagnetic field, according to some embodiments. The antenna may alternatively be any other type of antenna, as desired.

Each proximity sensing circuit may also include a shield driver. The shield driver may be configured to shield signals transmitted by the antenna in one or more directions. For example, the shield driver may be positioned between the antenna and an offending direction (e.g., a direction in which a metal surface or other electromagnetic field distorting feature is present) and may be driven in phase with the antenna in order to shield signals transmitted by the antenna in the direction of the shield driver (and therefore also in the offending direction).

The digital data may be collected based on electromagnetic signals received from another proximity sensing circuit via the antenna. In some embodiments, the plurality of proximity sensing circuits may be configured to transmit and receive electromagnetic signals in a coordinated manner, such that at any given time, only one of the plurality of proximity sensing circuits is transmitting, while one (or more) other of the proximity sensing circuits is receiving and collecting digital data based on the transmitted signals. For example, at a first time, a first proximity sensing circuit might transmit first electromagnetic signals while a second proximity sensing circuit might receive the first electromagnetic signals. Then, at a second time, the second proximity sensing circuit might transmit second electromagnetic signals while the first proximity sensing circuit maight receive the second electromagnetic signals. The first and second proximity sensing circuits may alternate transmitting-receiving-transmitting-etc in a repeating manner, according to some embodiments.

In some embodiments, the received electromagnetic signals may be modified by one or more user proximity gestures. For example, if a user performs a gesture in the proximity of the proximity sensing circuits, the gesture may modify or disturb the electromagnetic field generated by one of the proximity sensing circuits. The received signal strength at a proximity sensing circuit which is collecting data at that time may accordingly be affected.

As previously noted, in many embodiments the method may be performed by a consumer electronic device, which may typically provide a hostile environment for what may potentially be a very sensitive technology. For example, while typical capacitance changes for a capacitive touch sensor are about 100 fF, a noncontact proximity sensor may only see a capacitance change of 5 fF. The conducted and radiated noise spectrum is full of signals from WiFi, GSM, and switching power supplies, and these interfering signals are often applied by a user at a distance of just a few centimeters due to the portable nature of their other personal devices. Signal routing and noise filtering must be handled intelligently. Without shielding, communicating analog signals may not be feasible, while shielding communication lines may represent an undesirable expense. For this reason, it may be desirable that the signal data be collected in or converted to digital form at the proximity sensing circuits.

As will be recognized by those skilled in the art, different gestures (including similar gestures performed in different locations) may have different effects on an electromagnetic field. In some embodiments, the proximity sensing elements may alternate between data collection (and/or multiple proximity sensing elements may collect data simultaneously, e.g., in a system with three or more proximity sensing elements) sufficiently rapidly that multiple proximity sensing circuits may collect signal strength data during a single user proximity gesture. The differences in signal strength over time and at different locations (e.g., the different locations of the proximity sensing circuits) may be collected in the digital data collected by the proximity sensing circuits.

In 304, the digital data may be received by a coordination circuit. The digital data may be received from each of the plurality of proximity sensing circuits via a coupling element. In one set of embodiments, each proximity sensing circuit may be coupled to the coordination circuit by a single wire communication bus. Other types of coupling elements are also possible.

In one set of embodiments, the coupling may be a unidirectional data coupling. In other words, the coupling may be configured such that data may be transmitted only in one direction, e.g., from the proximity sensing circuits to the coordination circuit. This may be desirable as a cost- and/or space-saving feature (e.g., in some embodiments a single wire interface may be used), and may reduce digital overhead, in some embodiments. According to one set of embodiments, a unidirectional data bus capable of transmitting a 100 kbps serial data stream (when powered on) may be used. Other (e.g., higher or lower) data rates may alternatively be used if desired, including data rates of different orders of magnitude.

It should be noted that the unidirectional nature of the data coupling may not preclude all elements of control on the part of the coordination circuit; for example, according to some embodiments, a communication bus may be used which implements coordination circuit controlled power management. In other words, while the communication bus may be configured for communication of data only from the slave to the host, the host may be configured to control whether the communication bus is powered up or down. Power management capabilities may be particularly important in embodiments in which the system implementing the method is battery powered, which is of course common in many consumer electronic devices. The coordination and/or interpretation circuit(s) may be configured to efficiently manage the duty cycle of the sensors so there is no wasted energy.

While a unidirectional data coupling may be desirable in some embodiments for the reasons provided above, in other embodiments, bi-directional communication (using a coupling element/communication bus configured for bi-directional communication) may be desirable. For example, in some embodiments, bi-directional communication may be desirable so that the coordination circuit may provide configuration information, such as for re-calibrating the proximity sensing circuits, and a higher level of sensor coordination than simply powering on/off the data connection.

In 306, coordinated digital data may be produced by the coordination circuit. The coordinated digital data may include digital data from each of the plurality of proximity sensing circuits. The coordinated digital data may include synchronized, realtime sensor data configured for use in determining that a user performed one or more user proximity gestures, in particular in relatively noisy environments.

The coordination circuit may be tasked with multiplexing sensor operation. In other words, the coordination circuit may control which proximity sensing circuit transmits and which proximity sensing circuit(s) are collecting data at any given time. In some embodiments, the coordination circuit may coordinate the proximity sensing circuits according to a regular schedule, such that the tasks performed by the proximity sensing elements are performed at regular repeating intervals. The coordination circuit may be configured to control the proximity sensing circuits via controlling power to the proximity sensing circuits (e.g., through a unidirectional data bus, as described above) and/or via configuration messages (e.g., through a bidirectional data bus, as alternatively described above). The coordination circuit may also perform sensor power management based on policy provided by a host (e.g., an interpretation circuit). In some embodiments the proximity sensing circuits may be partially or entirely configured by manual control, e.g., by pin strapping.

The coordination circuit may collect data from the sensors and deliver a synchronized set of data to an interpretation circuit (e.g., the host). According to one set of embodiments, the coordination circuit may communicate the synchronized data to the interpretation circuit at a 100 Hz update rate. Any other update rate may alternatively be used if desired. A generic communication bus such as I$^2$C, or any of a variety of other communication buses, may be used to provide a register-based interface for data and configuration.

In 308, the coordinated digital data may be interpreted. The coordinated digital data may be interpreted by the interpretation circuit, which, as noted above, may be a host controller according to some embodiments. The interpretation circuit may be configured to handle regular data communications, e.g., according to the coordination circuit's update rate. According to one set of embodiments the data transfers may be performed at approximately 10-40 Kbps, e.g., depending on protocol overhead and single vs. block mode transfers, which may be configured as desired. For example, in one set of embodiments, approximately 50-100 bits of sensor information may be received at the 100 Hz update rate. This may allow for decisions (e.g., gesture interpretations) to be made in a period of 50-100 ms in some embodiments; other decision timeframes are also possible. Other data transfer rates including different amounts of sensor information may alternatively be used as desired. In some embodiments, the interpretation circuit may also include dedicated RAM for storage. For example, in one set of embodiments, the interpretation circuit may be configured to store and utilized 100-200 data sets (e.g., representing 1-2 seconds worth of raw gesture data) at any given time. Any of a variety of processing loads and program memory sizes may be used as desired, e.g., depending on other desired implementation details.

Interpreting the coordinated digital data may include determining that a user performed one or more user proximity gestures. For example, according to one set of embodiments, an algorithm may be used to determine, based on the coordinated digital data, one or more of direction, speed, size, and/or location of a user-controlled object in proximity to one or more of the proximity sensing circuits with sufficient precision to identify a gesture performed by the user-controlled object. User behavior may be confusing, but while a wide range of gesture speeds and signal strengths may be tolerated, errors should also be minimized.

Accordingly, the algorithm used by the interpretation circuit may further be configured to avoid misinterpretation of movements which are not intended as gestures. For example, the coordinated digital data may contain sufficient information, and the interpretation algorithm may be sufficiently sophisticated, as to avoid misinterpretation of an insect flying in the vicinity of the proximity sensing circuits as a user-performed gesture, e.g., based on differences in the coordinated digital data resulting from the size of the insect and/or the quality of the motion of the insect. The interpretation algorithm (and the coordinated digital data on which the interpretation is based) may also be configured to avoid misinterpretation of other unintended gestures, including unintended gestures performed by a user, as well.

It should be noted that while in some embodiments the coordination circuit and interpretation circuit may be implemented as discrete circuits (e.g., as described above using an $I^2C$ or other bus for communication therebetween), in other embodiments the coordination circuit and interpretation circuit may be implemented as a single circuit. For example, a combined controller for gesture analysis and real-time sensor control may have many advantages, including lower cost, elimination of the communications bus and flexibility during development and in production. For example, using an MCU for the coordination circuit may provide highly desirable flexibility during development stages. Alternatively, or in addition (e.g., at a later development stage), a combination part could be committed to a state machine, e.g., for reduced cost and energy consumption and increased efficiency (but potentially at the cost of flexibility).

Alternatively, the analysis portion could be moved to another host controller (e.g., an existing MCU such as a notebook keyboard controller or USB card reader controller) so the firmware can be tightly coupled to the rest of the system and only developed and maintained in one place. In this case only the real-time sensor control (e.g., the coordination circuit) may remain in the IC and could, in some embodiments, be treated as a register-configurable application specific standard product (ASSP).

Figure 4:
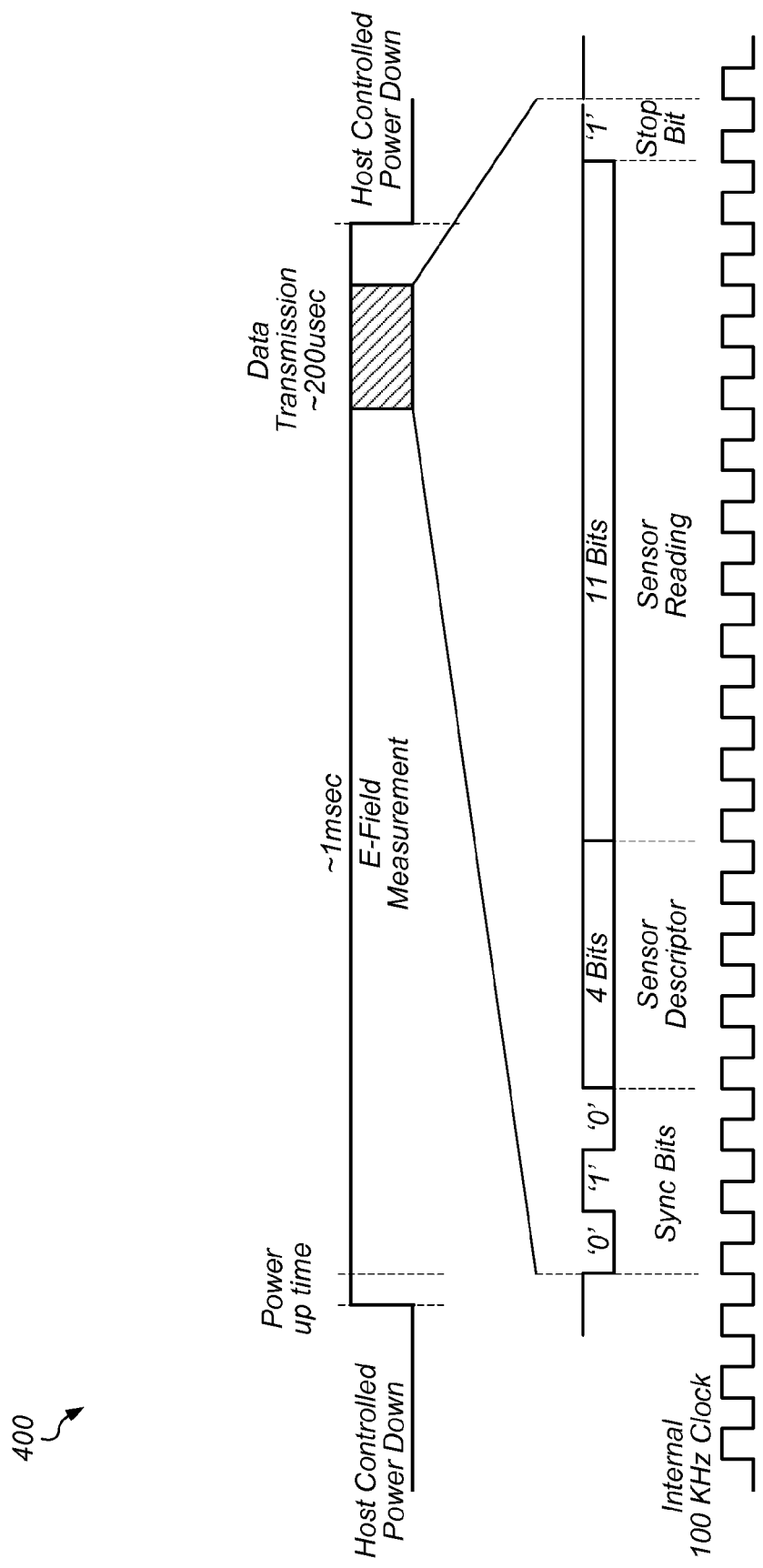
FIG. 4 is a timing diagram illustrating data transfer from a proximity sensing circuit to a coordination circuit according to one set of embodiments.

FIG. 4—Timing Diagram

FIG. 4 is a timing diagram 400 illustrating data transfer from a proximity sensing circuit to a coordination circuit according to one set of embodiments. In the embodiment shown, the data transfer may be performed using a unidirectional communication bus with host controlled power management. When a sensor is enabled to measure (e.g., via powering on of the communication bus), it may power up internal blocks, perform measurements, and output a 100 kbps serial data stream. This may continue until the host disables the sensor by pulling the data line low, at which time the sensor may power down.

As shown, the communication bus may operate according to an internal 100 KHz clock in one set of embodiments. Data transmissions may include minimal overhead (e.g., a few sync bits, a few bits identifying a sensor number and type, and a stop bit) surrounding the data itself.

While the exemplary system illustrated by the timing diagram 400 shown in FIG. 4 represents one possible system for communication between proximity sensing circuits and a coordination circuit, other systems are also possible, and so FIG. 4 and the description thereof should not be considered limiting to the disclosure as a whole.

Figure 5:
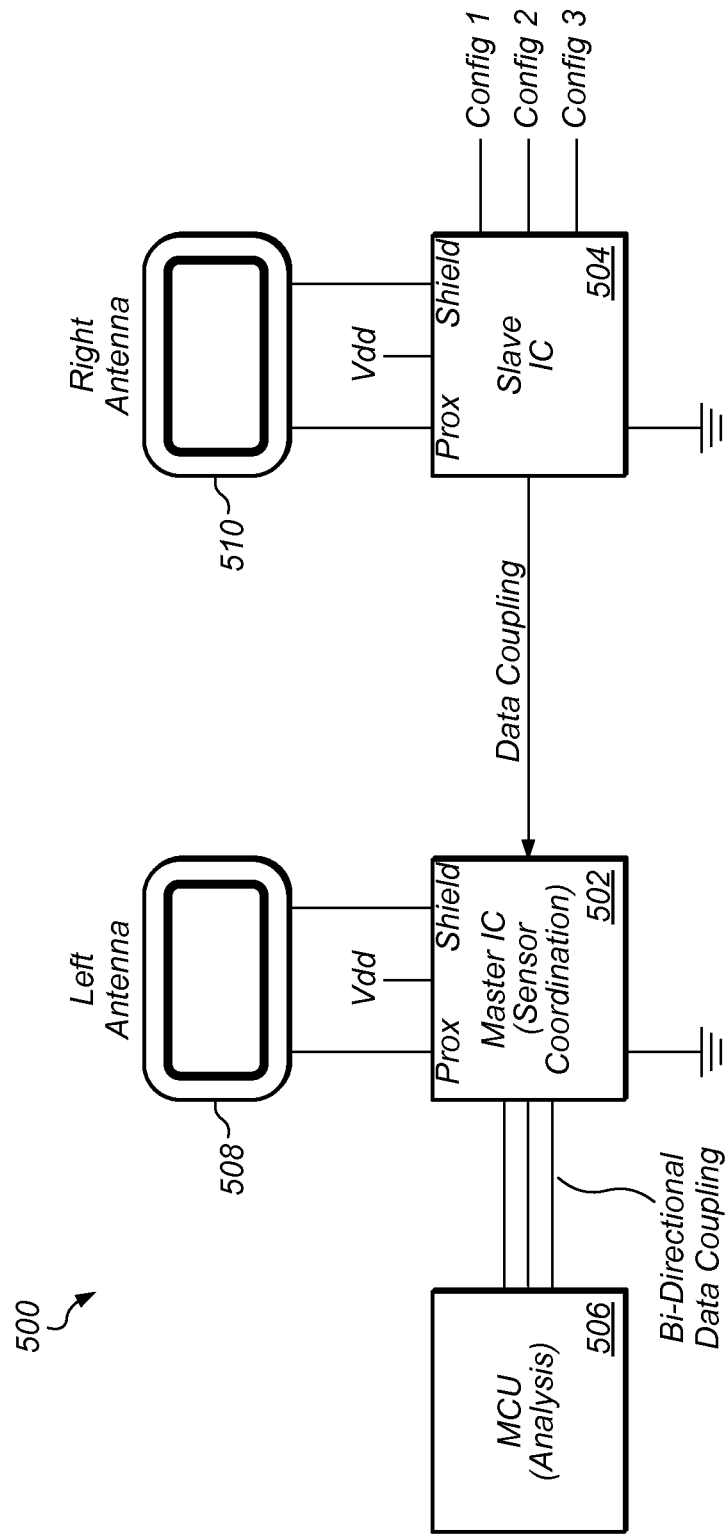
FIG. 5 is a block diagram illustrating a proximity sensing system including two proximity sensing circuits according to one set of embodiments.

FIG. 5—Exemplary System Diagram

FIG. 5 is a block diagram illustrating one possible system 500 including two proximity sensing circuits. In the exemplary system 500 of FIG. 5, each of the proximity sensing circuits may be an 8 pin integrated circuit (IC). Master IC 502 may act as both the coordination circuit and a proximity sensing circuit, while slave IC 504 may function only as a proximity sensing circuit. Slave IC 504 may be coupled to master IC 502 via a data coupling, e.g., a unidirectional or bidirectional communication bus such as described elsewhere in this disclosure according to various embodiments. The master IC 502 may receive the slave IC 504 data via the data coupling and manage the slave IC 504 power via an active duty cycle, and may sequence sensor signals to avoid contention.

The master IC 502 may also be coupled to a host microcontroller (MCU) 506 which may act as an interpretation circuit. The master IC 502 and the host MCU 506 may be coupled using a bidirectional data coupling (e.g., a bi-directional communication bus), which may be used both for the master IC 502 to communicate coordinated sensor data to the host MCU 506, and for the host MCU 506 to communicate configuration information to the master IC 502. As shown, in one set of embodiments the data bus between the master IC 502 and the host MCU 506 may utilize three pins, while the bus between the master IC 502 and the slave IC 504 may utilize a single pin. Each of the master 502 and slave 504 ICs may include pins configured for an antenna connection (e.g., a proximity sensing element) and a shield driver. Each of the master 502 and slave 504 ICs may also include power supply pins (e.g., Vdd and ground). The slave IC 504 may also include three configuration pins for manual pin strapping (e.g., to manually configure IC parameters/configuration settings).

As shown, the antenna connections may include a left antenna 508 and a right antenna 510. The two-sensor system shown in FIG. 5 may be appropriate for one-dimensional gesture detection (e.g., gestures in a left-right plane). While a left-right orientation may be appropriate for some applications, other orientations (e.g., up-down, diagonal, or another orientation) may be appropriate for other applications and may also be used.

Figure 6:
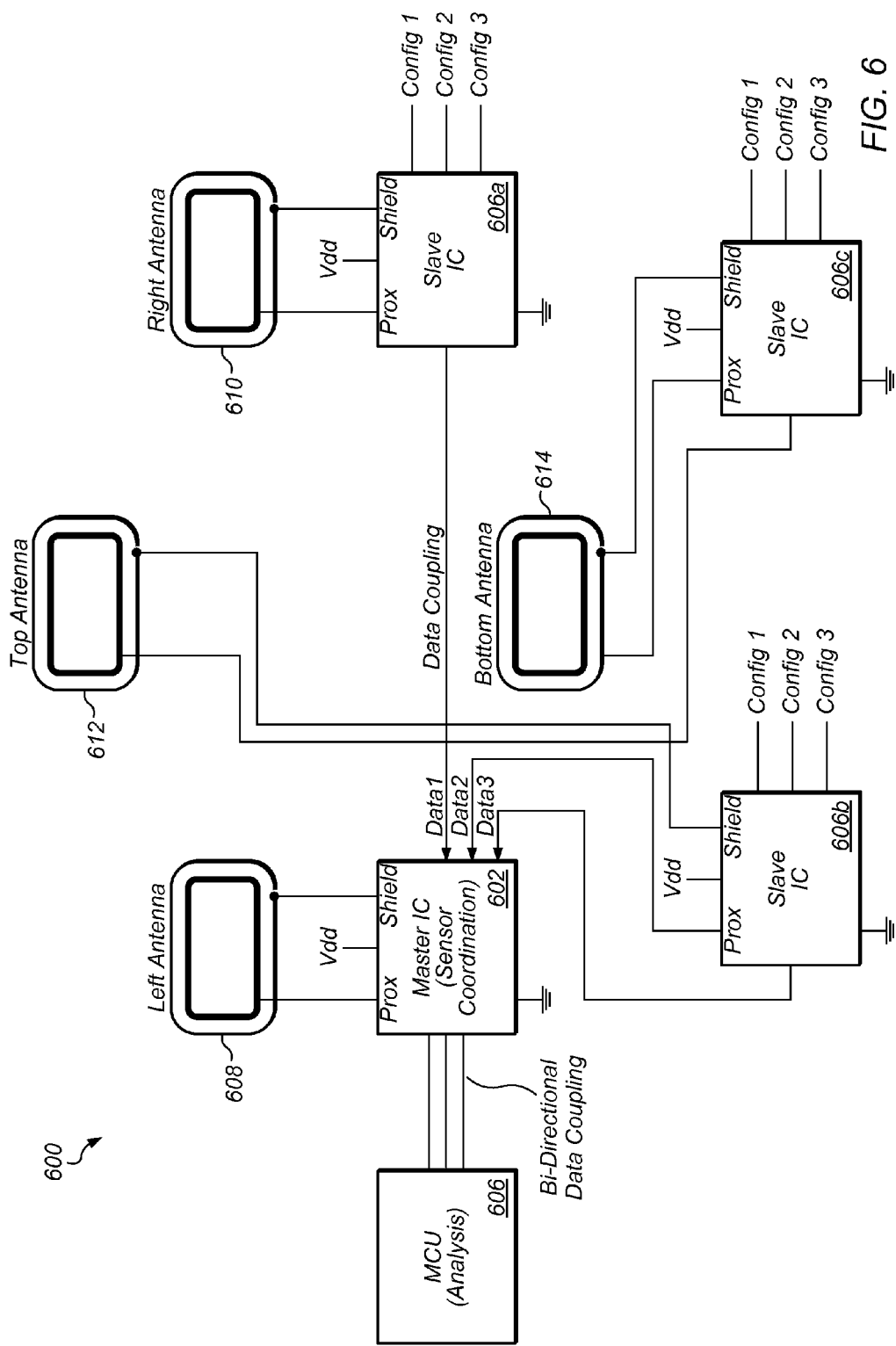
FIG. 6 is a block diagram illustrating a proximity sensing system including four proximity sensing circuits according to one set of embodiments.

FIG. 6—Exemplary System Diagram

FIG. 6 is a block diagram illustrating one possible system 600 including four proximity sensing circuits. As shown, the system 600 of FIG. 6 may be substantially similar in architecture to the system 500 of FIG. 5, with the notable exceptions that the system includes two additional slave ICs 604*b-c* and that the master IC 602 includes two additional pins for data couplings to couple to the two additional slave ICs 604*b-c*.

Thus, in the exemplary system 600 of FIG. 6, the master IC 602 may be a 10 pin integrated circuit while each of the slave ICs 604*a-c* may be 8 pin integrated circuits. As in the system of FIG. 5, master IC 602 may act as both the coordinating circuit and a proximity sensing circuit, while slave ICs 604*a-c* may function only as proximity sensing circuits. Slave ICs 604*a-c* may be coupled to master IC 602 via a communication bus, e.g., a unidirectional or bidirectional communication bus such as described elsewhere in this disclosure according to various embodiments. The master IC 602 may receive the slave ICs 604*a-c* data via the communication buses and manage the slave ICs 604*a-c* power via an active duty cycle, and may sequence sensor signals to avoid contention.

Similarly to the system 500 of FIG. 5, the master IC 602 may also be coupled to a host microcontroller (MCU) 606 which may act as an interpretation circuit. The master IC 602 and the host MCU 606 may be coupled using a bidirectional data coupling (e.g., a bi-directional communication bus), which may be used both for the master IC 602 to communicate coordinated sensor data to the host MCU 606, and for the host MCU 606 to communicate configuration information to the master IC 602. As shown, in one set of embodiments the data bus between the master IC 602 and the host MCU 606 may utilize three pins, while each bus between the master IC 602 and a respective slave IC 604 may utilize a single pin. Each of the master 602 and slave 604*a-c* ICs may include pins configured for an antenna connection (e.g., a proximity sensing element) and a shield driver. Each of the master 602 and slave 604*a-c* ICs may also include power supply pins (e.g., Vdd and ground). The slave ICs 604*a-c* may also include three configuration pins for manual pin strapping (e.g., to manually configure IC parameters/configuration settings).

The system 600 of FIG. 6, with four proximity sensing circuits, may be appropriate for detecting and interpreting gestures performed in two or even three dimensions. For example, the antennas 608, 610, 612, 614 may be oriented in both left-right and top-bottom orientations, and may be sufficiently sensitive that, based on data collected by the antennas 608, 610, 612, 614, movement of a proximity gesturing implement in a depth dimension may be interpreted as well as movement of the proximity gesturing implement in the left-right and top-bottom directions.

It should be noted that while the proximity sensing systems shown in FIGS. 5-6 represent two possible proximity sensing systems, those of skill in the art will recognize that any number of other system configurations (including different components and/or similar components implemented in different ways) may be used as desired, and the proximity sensing systems shown in and described with respect to FIGS. 5-6 should not be considered limiting to the disclosure as a whole.

Figure 7A:
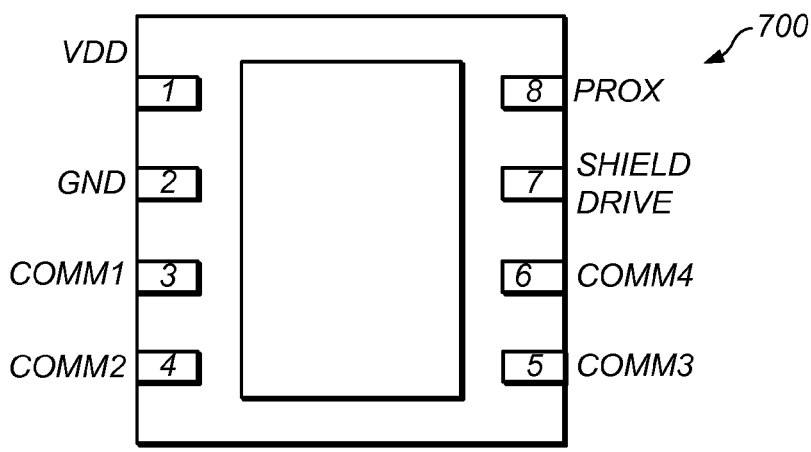
FIGS. 7-8 illustrate possible pin configurations for slave and master ICs according to one set of embodiments.
Figure 7B:
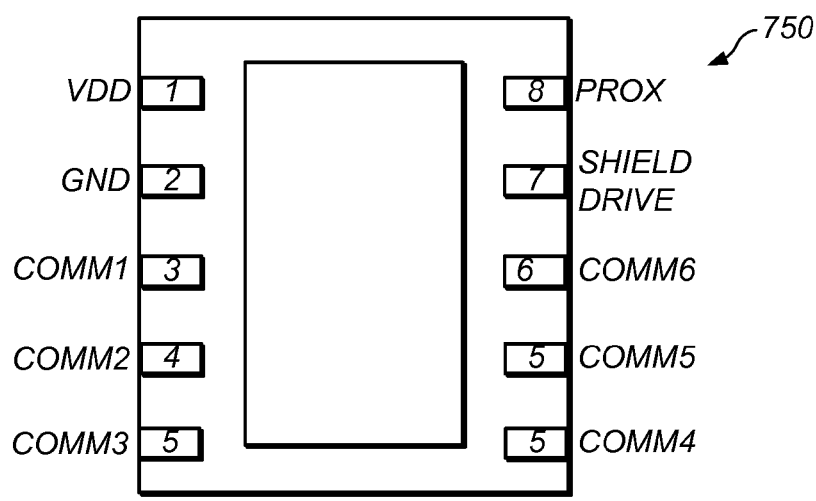
Figure 8:
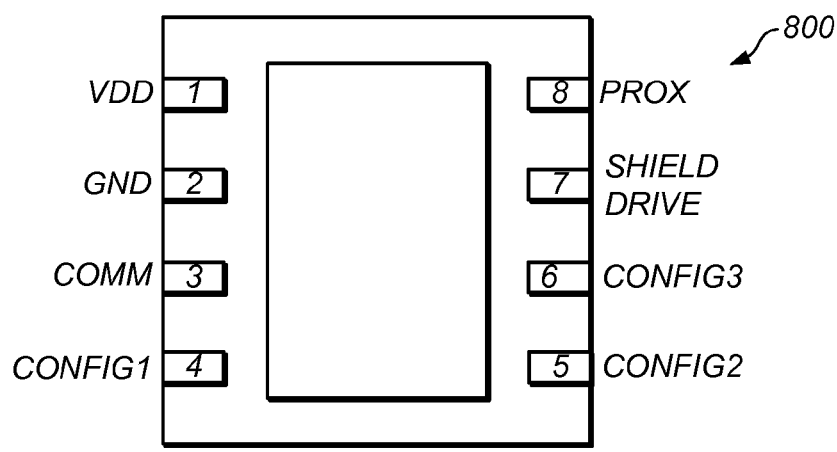

FIGS. 7-8—IC diagrams

FIGS. 7-8 illustrate possible pin configurations for slave and master ICs such as those illustrated in FIGS. 5 and 6. FIGS. 7A illustrates possible pin configurations for a master IC 700 configured to control a single slave IC, while FIG. 7B illustrates possible pin configurations for a master IC 750 configured to control three slave ICs.

As shown, both master IC 700 and master IC 750 may include power supply pins Vdd (pin 1) and GND (pin 2). Pins 3-5 may be dedicated to a communication bus used to communicate between the master IC 700 (or 750) and an interpretation circuit (e.g., a host MCU). Master IC 700 may include a single pin (pin 6) for communicating with its lone slave IC, while master IC 750 may include three pins (pins 6-8) for communicating with its three slave ICs. The master IC 700 may include a shield driver connection and proximity sensing element (e.g., antenna/electrode) connection as its final two pins (pins 7-8). The master IC 750 may also include a shield driver connection and proximity sensing element (e.g., antenna/electrode) connection as its final two pins (pins 9-10).

FIG. 8 illustrates possible pin configurations for a slave IC 800, such as might be controlled by master IC 700 or master IC 750 shown in FIGS. 7A-B. As shown, slave IC 800 may include power supply pins Vdd (pin 1) and GND (pin 2). Slave IC 800 may include a single pin (pin 3) for communicating with its master IC. Pins 4-6 may be dedicated to different pin-strapping configuration options. For example, parameters which might be adjusted (e.g., to different hard-coded combinations) via pin strapping of pins 4-6 might include sensitivity/gain, averaging/filtering, digital features such as negative delta count, noise blocking, max duration, etc., and recalibration. The slave IC 800 may also include a shield driver connection and proximity sensing element (e.g., antenna/electrode) connection as its final two pins (pins 9-10).

It should be noted that while the pin configurations illustrated in FIGS. 7-8 represent one set of possible pin configurations of master and slave ICs, any number of other configurations may be used as desired, and the configurations shown in and described with respect to FIGS. 7-8 should not be considered limiting to the disclosure as a whole.

FIGS. 9-10—Exemplary PCB and Flex Circuit Implementations

Figure 9A:
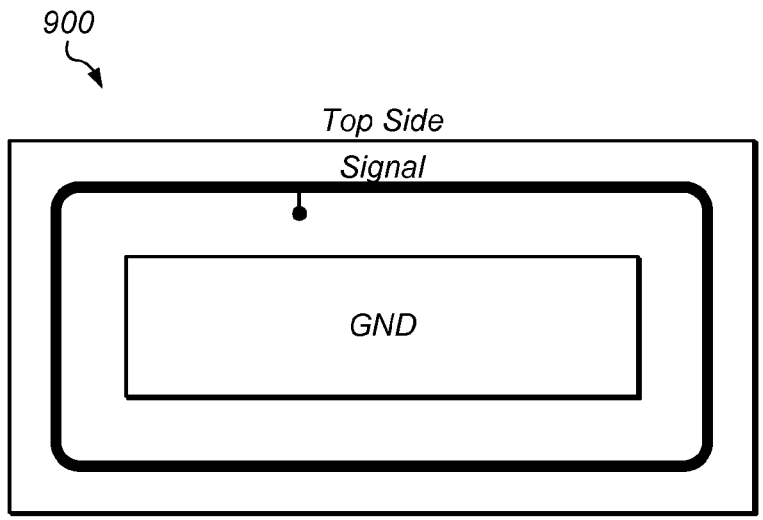
FIGS. 9-10 illustrate top- and bottom-sides of PCB and Flex Circuit implementations, respectively, of a proximity sensing circuit according to one set of embodiments.
Figure 9B:
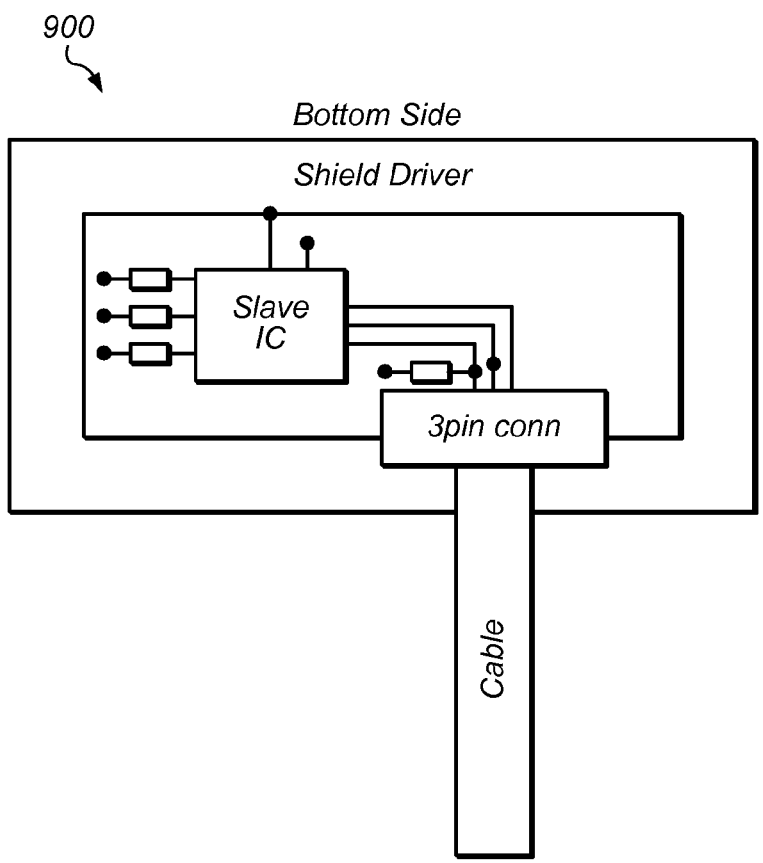
Figure 10A:
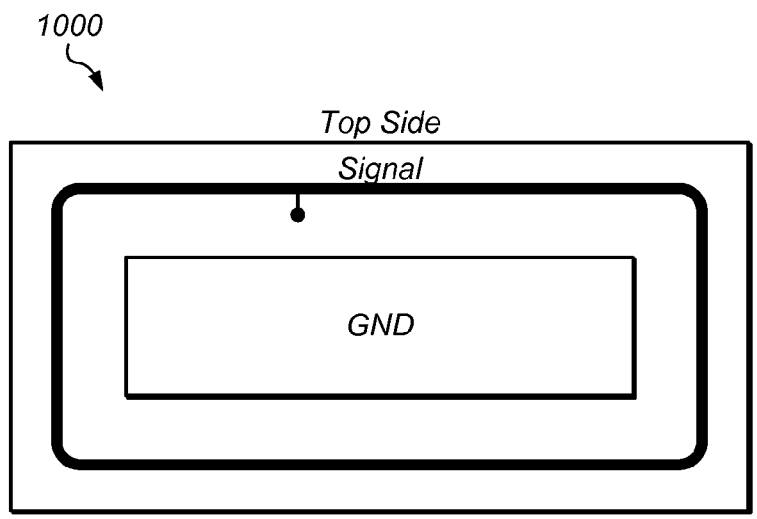
Figure 10B:
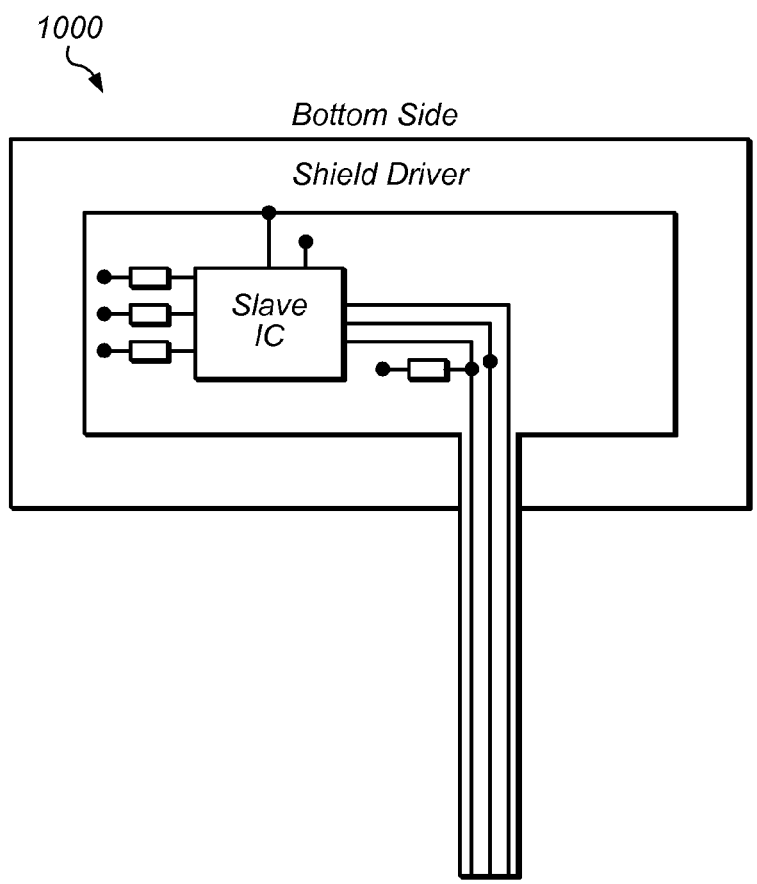

FIGS. 9A-9B illustrate a top- and bottom-side of a printed circuit board (PCB) 900 implementing a proximity sensing circuit according to one set of embodiments. FIGS. 10A-10B illustrate a top- and bottom-side of a Flex Circuit 1000 implementing a proximity sensing circuit according to one set of embodiments.

As shown, the implementations of the proximity sensing circuits may be similar (e.g., including slave ICs, shield drivers, antennas, mode pins, and power supply and communication bus connections) for both the PCB and flex circuit implementations. The primary difference may lie with the use of a 3 pin connector in the PCB implementation, which may be coupled using a cable to other system elements (e.g., power supply and coordination circuit). In contrast, the flexible substrate of the flex circuit may allow the power supply and communication bus connections to continue directly to the other system elements via permanent couplings. This may be desirable in some embodiments in order to eliminate connectors such as the 3 pin connector shown in the PCB implementation.

It should be noted that while the PCB and Flex Circuit implementations illustrated in FIGS. 9-10 represent two possible implementations of a proximity sensing circuit, any number of other implementations may be used as desired, and the implementations shown in and described with respect to FIGS. 9-10 should not be considered limiting to the disclosure as a whole.

Figure 11A:
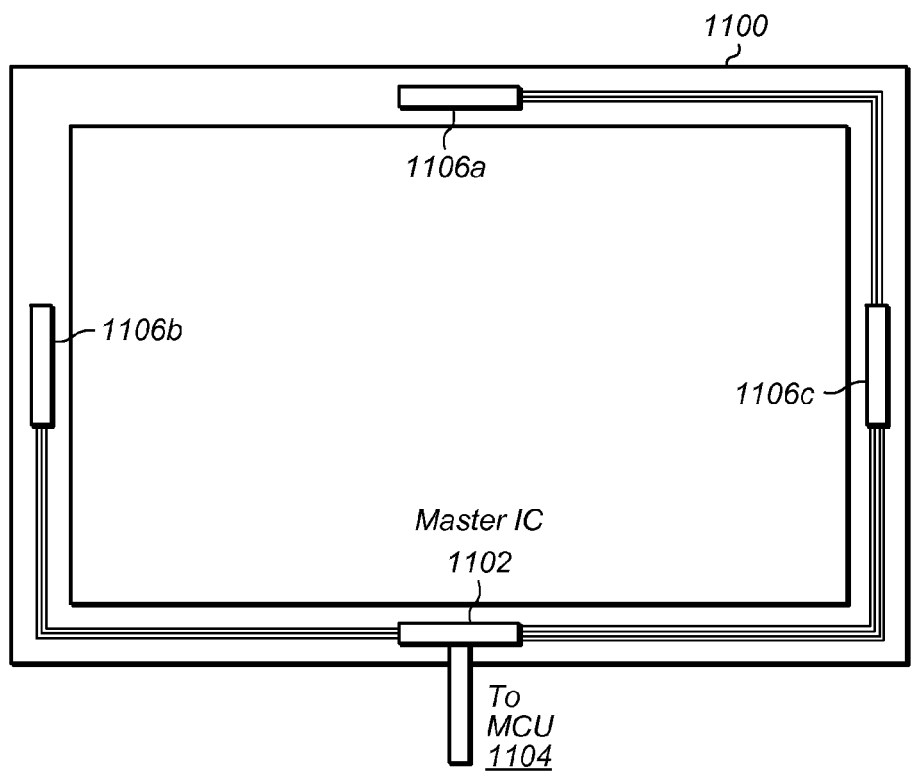
FIGS. 11A-11B illustrate possible arrangements of proximity sensing circuits on a bezel according to one set of embodiments.
Figure 11B:
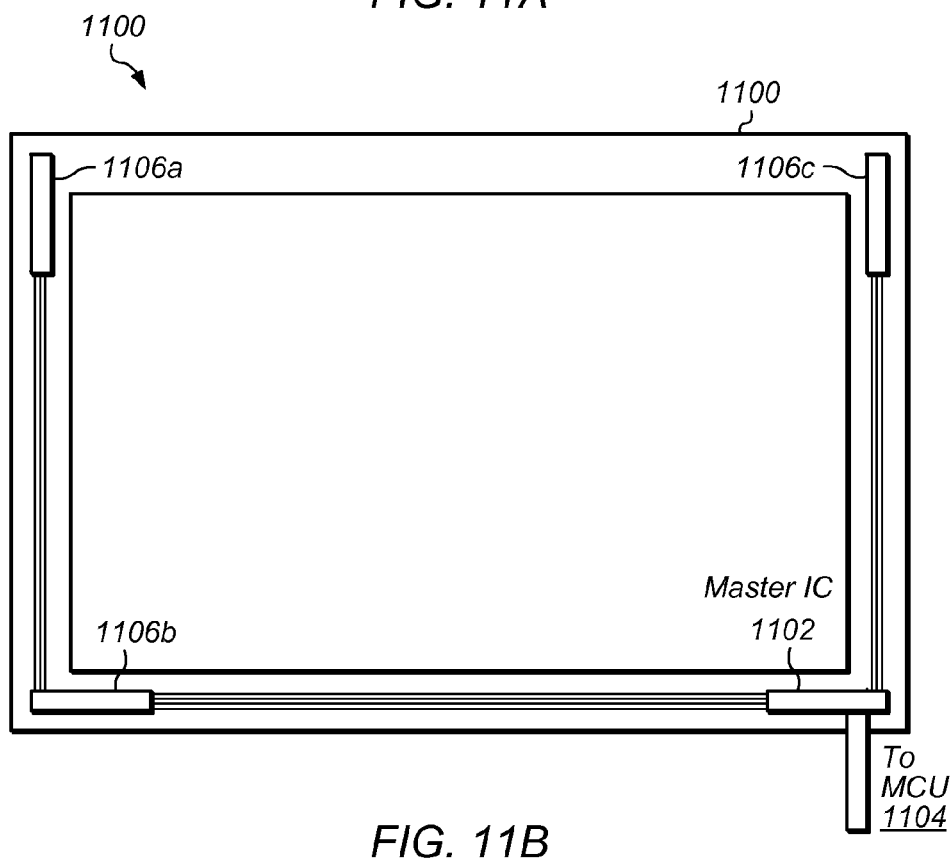

FIGS. 11A-B—Bezel Implementations

FIGS. 11A-11B illustrate possible arrangements of proximity sensing circuits on a bezel, e.g., along the edges of an electronic device in which the proximity sensing system is implemented.

As shown in FIG. 11A, one possible arrangement includes proximity sensing circuits centered at each of the top/bottom/left/right edges of the bezel 1100. As shown, master module 1102 (e.g., including a master IC) may be placed along a bottom edge and may be coupled to a host MCU 1104. The master module 1102 may include connections to each of slave ICs 1106*a-c*, which may be located centrally on each of the top, left, and right edges of the bezel 1100. This arrangement may be desirable for sensor location (e.g., depending on the gesture interpretation algorithm) and may be used if desired, however, this design may be difficult to implement using flex circuits, and thus an alternative arrangement such as shown in FIG. 11B may be more desirable in some embodiments.

In the arrangement shown in FIG. 11B, the proximity sensing circuits may be located at each of the corners of the bezel 1100. The master module 1102 may be placed along a bottom right corner and may be coupled to host MCU 1104. The master module 1102 may include connections to each of slave ICs 1106*a-c*, which may be located at each of the top left, bottom left, and top right corners of the bezel 1100. This arrangement may be more desirable in some embodiments, as the "L" shaped pattern may be relatively easily nested on a flex circuit sheet. In addition, cable access may more often be in the corner of a bezel. The corner positions of the sensors may also be desirable (again depending on the gesture interpretation algorithm), e.g., as they may be able to provide redundant information for up/down and right/left in such an embodiment.

It should be noted that while FIGS. 11A and 11B represent two possible sensor arrangements on a rectangular bezel, other bezel shapes and sensor arrangements (e.g., on a bezel or in other locations) are also possible and may be more desirable depending on the application. Accordingly, the implementations shown in and described with respect to FIGS. 11A-11B should not be considered limiting to the disclosure as a whole.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A proximity sensing system, the system comprising:
    a plurality of antenna arrangements, each comprising an electrode and a shield electrode;
    a plurality of spaced apart integrated circuit devices comprising proximity sensing circuits associated with the plurality of antenna arrangements,
    wherein each integrated circuit device comprises:
        a first external connection which in a first mode is configured as an output to transmit an alternating signal to the electrode of an associated antenna arrangement and in a second mode is configured as an input to receive electromagnetic signals from said electrode of the associated antenna arrangement;
        a shield driver configured in the first mode to generate a shield signal fed to said shield electrode; and
        logic configured to collect digital data based on electromagnetic signals received from another proximity sensing circuit via an associated antenna arrangement;
    a coordinating circuit, wherein the coordinating circuit is coupled to each of the plurality of proximity sensing circuits, wherein the coordinating circuit comprises logic configured to:
    set one of the plurality of proximity sensing circuits into the first mode and remaining ones of the plurality of proximity sensing circuits into the second mode;
    wherein the one of the plurality of proximity sensing circuits which is set into the first mode operates only as a transmitter while in the first mode, and
    the remaining ones of the plurality of proximity sensing circuits operate only as receivers while in the second mode and receive through capacitive coupling an electric field emitted by the one of the plurality of proximity sensing circuits which is set into the first mode.

2. The proximity sensing system of claim 1, wherein the digital data collected by the logic comprises a digital representation of signal strength of the electromagnetic signals received from the proximity sensing circuit which has been set into the first mode, wherein the signal strength of the electromagnetic signals may be modified by one or more user proximity gestures.

3. The proximity sensing system of claim 1, wherein the shield driver of the proximity sensing circuit configured to operate in the first mode is configured to generate the shield signal in phase with the alternating signal.

4. The proximity sensing system of claim 1, wherein the system comprises a first and a second proximity sensing circuit which are configured to transmit and receive electromagnetic signals in a coordinated manner such that:
    the first proximity sensing circuit is configured to operate in the first mode to transmit first electromagnetic signals while a second proximity sensing circuit is configured to operate in the second mode to receive the first electromagnetic signals at a first time; or
    the second proximity sensing circuit is configured to operate in the first mode to transmit second electromagnetic signals while the first proximity sensing circuit is configured to operate in the second mode to receive the second electromagnetic signals at a second time.

5. The proximity sensing system of claim 1, wherein the coordinating circuit logic is configured to receive the digital data from the remaining ones of the plurality of proximity sensing circuits according to a schedule, wherein the coordinating circuit logic is configured to receive digital data from one proximity sensing circuit at a time.

6. The proximity sensing system of claim 1, wherein the coordinating circuit and each of the plurality of proximity sensing circuits are coupled via unidirectional data couplings.

7. The proximity sensing system of claim 1, wherein the proximity sensing system comprises at least three proximity sensing circuits, wherein the one or more user proximity gestures comprise at least one proximity gesture in at least two dimensions.

8. The proximity sensing system of claim 1, wherein the proximity sensing system comprises at least four proximity sensing circuits, wherein the one or more user proximity gestures comprise at least one proximity gesture in three dimensions.

9. The proximity sensing system of claim 1, the system further comprising a single flexible substrate, wherein the plurality of proximity sensing circuits and the coordinating circuit are comprised on the single flexible substrate.

10. The proximity sensing system of claim 1, wherein the coordinating circuit logic is further configured to produce coordinated digital data from the digital data received from the remaining ones of the plurality of integrated circuit devices, wherein the coordinated digital data comprises the digital data from each of the remaining ones of the plurality of integrated circuit devices, wherein the coordinated digital data is configured for use in determining that a user performed one or more user proximity gestures.

11. The proximity sensing system of claim 10, wherein the system further comprises an interpretation circuit, wherein the interpretation circuit comprises logic configured to:
    receive the coordinated digital data;
    interpret the coordinated digital data, wherein said interpreting determines that a user performed the one or more user proximity gestures.

12. A method for collecting proximity sensing data using a plurality of spaced apart integrated circuit devices each comprising a proximity sensing circuit and associated antenna arrangements, wherein each antenna arrangement comprises an electrode and a shield electrode, the method comprising:
    configuring one of the plurality of integrated circuit devices as a transmitter, wherein an alternating transmission signal is fed to the electrode and a shield signal is fed to the shield electrode of an associated antenna arrangement;
    configuring remaining ones of the plurality of integrated circuit devices as receivers, wherein electromagnetic signals generated by the transmitter are received through capacitive coupling between the electrode of the transmitter and an electrode of an associated antenna arrangement of a receiver;

collecting, by the remaining ones of the plurality of integrated circuit devices, digital data;

receiving, by a coordinating circuit, the digital data from each of the remaining ones of the plurality of integrated circuit devices.

13. The method of claim 12, wherein the digital data collected by the receivers comprises a digital representation of signal strength of electromagnetic signals received from the transmitter, wherein the signal strength of the electromagnetic signals can be modified by one or more user proximity gestures.

14. The method of claim 12, wherein the shield signal is in phase with the alternating transmission signal transmitted by the transmitter.

15. The method of claim 12, further comprising:
at a first time: a first proximity sensing circuit is configured as transmitter for transmitting first electromagnetic signals;
a second proximity sensing circuit is configured as receiver for receiving the first electromagnetic signals;
at a second time:
the second proximity sensing circuit is configured as transmitter for transmitting second electromagnetic signals;
the first proximity sensing circuit is configured as receiver for receiving the second electromagnetic signals.

16. The method of claim 12, wherein the coordinating circuit receives the digital data from the remaining ones of the plurality of integrated circuit devices according to a schedule, wherein the coordinating circuit receives digital data from one proximity sensing circuit at a time.

17. The method of claim 12, wherein the coordinating circuit and each of the plurality of proximity sensing circuits are coupled via unidirectional data couplings.

18. The method of claim 12, wherein the plurality of integrated circuit devices comprise at least three integrated circuit devices, wherein the one or more user proximity gestures comprise at least one proximity gesture in at least two dimensions.

19. The method of claim 12, wherein the plurality of integrated circuit devices comprise at least four integrated circuit devices, wherein the one or more user proximity gestures comprise at least one proximity gesture in three dimensions.

20. The method according to claim 12, further comprising:
producing, by the coordinating circuit, coordinated digital data from the digital data received from each of the plurality of integrated circuit devices, wherein the coordinated digital data comprises the digital data from each of the plurality of integrated circuit devices, wherein the coordinated digital data is configured for use in determining that a user performed one or more user proximity gestures.

21. The method of claim 20, further comprising:
receiving, by an interpretation circuit, the coordinated digital data;
interpreting, by the interpretation circuit, the coordinated digital data, wherein said interpreting determines that a user performed the one or more user proximity gestures.

22. An integrated proximity sensing circuit device, comprising:
a first external pin configured to be connected with a first electrode, wherein in a first mode the first external pin is configured as an output to only transmit an alternating signal and in a second mode the first external pin is configured as an input to only receive electromagnetic signals from said electrode;
a shield driver connected to a second external pin configured to be connected with a shield electrode, wherein in the first mode the shield driver is configured to generate a shield signal;
logic configured to collect digital data based on electromagnetic signals received through said first external pin; and
a control interface, wherein the integrated proximity sensing circuit is configured as a slave device operable to receive configuration data to operate either in said first or said second mode, wherein the integrated proximity sensing device is configured to only connect with a single electrode and a single shield electrode.

* * * * *